(12) United States Patent  (10) Patent No.: US 12,337,540 B2
Chung et al.  (45) Date of Patent: Jun. 24, 2025

(54) CURING DEVICE FOR 3-DIMENSIONAL PRINTER PRODUCT AND CURING METHOD FOR 3-DIMENSIONAL PRINTER PRODUCT

(71) Applicants: Jun Woo Sohn, Yorba Linda, CA (US); Cheon Kee Chung, Seoul (KR)

(72) Inventors: Cheon Kee Chung, Seoul (KR); Jaehyeon Leem, Seoul (KR)

(73) Assignees: Jun Woo Sohn, Yorba Linda, CA (US); Cheon Kee Chung, Seoul (KR)

( * ) Notice: Subject to any disclaimer, the term of this patent is extended or adjusted under 35 U.S.C. 154(b) by 227 days.

(21) Appl. No.: 17/843,959

(22) Filed: Jun. 18, 2022

(65) Prior Publication Data

US 2023/0321910 A1 Oct. 12, 2023

(30) Foreign Application Priority Data

Apr. 8, 2022 (KR) .................. 10-2022-0043920

(51) Int. Cl.
  *B29C 64/264* (2017.01)
  *B29C 64/371* (2017.01)
  *B33Y 10/00* (2015.01)
  *B33Y 40/20* (2020.01)

(52) U.S. Cl.
  CPC .......... *B29C 64/264* (2017.08); *B29C 64/371* (2017.08); *B33Y 10/00* (2014.12); *B33Y 40/20* (2020.01)

(58) Field of Classification Search
  CPC ..... B29C 64/264; B29C 64/371; B33Y 10/00; B33Y 40/20
  See application file for complete search history.

(56) References Cited

U.S. PATENT DOCUMENTS

2018/0085993 A1* 3/2018 Biskop ................. B29C 64/112
2022/0032506 A1* 2/2022 Salfetnikov ............ B29C 64/40

FOREIGN PATENT DOCUMENTS

KR 2020-0054946 A * 5/2020
KR 202100045951 A1 * 4/2021

OTHER PUBLICATIONS

Written Opinion, Korean Intellectual Property Office, Patent Application No. 20 2 2-00 4 39 20, Aug. 22, 2022 (Year: 2022).*

(Continued)

*Primary Examiner* — Michael M. Robinson
(74) *Attorney, Agent, or Firm* — McLean IP Global; Jason Y. Pahng

(57) ABSTRACT

The curing device for a 3D printer product may comprise a chamber having an accommodation space for accommodating 3D printer products (hereinafter referred to as 3D printer product), and configured to perform a curing process on the 3D printer product accommodated in the accommodation space under each of a first condition corresponding to a non-vacuum air atmosphere and a second condition corresponding to a vacuum state; a vacuum pump connected to the chamber to form a vacuum in the chamber; an air injection member connected to the chamber to remove a vacuum by injecting air into the chamber; a plurality of light source modules which are members installed inside the chamber to irradiate light for the curing process to the 3D printer product.

8 Claims, 11 Drawing Sheets

(56) References Cited

OTHER PUBLICATIONS

Machine translation of KR20210045951A, "3D Vacuum and air post-curing device of dentistry 3D printer output object" espacenet.com (Year: 2024).*
Visible Light, https://science.nasa.gov/ems/09_visiblelight/ (Year: 2024).*
Machine Translation of Kim Jung (Kr 2020-0054946A) "UV light curing device to improve curing performance of dimensional laminate" (Year: 2020).*

* cited by examiner

CURING DEVICE FOR 3-DIMENSIONAL PRINTER PRODUCT AND CURING METHOD FOR 3-DIMENSIONAL PRINTER PRODUCT

CROSS-REFERENCES TO RELATED APPLICATION

The present application claims, under 35 U.S.C. § 119(a), the benefit of Korean application No. 10-2022-0043920, filed on, Apr. 8, 2022, which is herein incorporated by reference in its entirety.

BACKGROUND OF THE INVENTION

1. Field

The present invention relates to a device and a method for curing a polymer or a resin, and more particularly, to a curing device and a curing method for curing a product manufactured by a 3D (3-dimensional) printer.

2. Description of the Related Art

Since a work manufactured by a 3D printer (hereinafter, referred to as a 3D printer product) is not in a cured state immediately after manufacturing, but is in a soft state, a reinforcing process is required to harden after manufacturing so that the original shape of manufactured may be maintained.

In general, reinforcing of a 3D printer product is performed through a curing process, and a method of irradiating ultraviolet (UV) light is used. However, according to the conventional method, there is a problem in that it is difficult to uniformly harden the surface and the inside of the 3D printer. Specifically, when using the conventional method, there is a problem that the surface of the 3D printer product is not hardened well, or conversely, the inside of the 3D printer product is not hardened well.

When the surface of the 3D printer product is not well cured, very strong ultraviolet rays may be irradiated for a relatively long time for a surface curing. However, in this case, overcuring may occur along the surface bending of the product, resulting in discoloration or deformation. Meanwhile, when the inside of the 3D printer product is not well cured, a separate thermal curing process may be additionally performed after the ultraviolet UV curing process. However, when the thermosetting process is additionally performed, there is a problem that the process becomes complicated and cumbersome. In addition, when the surface is cured as a first process, and then the inside is cured, the defects such as cracks may occur in the already cured surface during the internal curing process.

Therefore, there is a need for a curing device and a curing technology capable of uniformly, easily and efficiently curing the surface and the inside of a 3D printer product without any problems such as discoloration, deformation, or generation of cracks.

SUMMARY OF THE INVENTION

A technological object to be achieved by the present invention is to provide a curing device and a curing method capable of uniformly, easily efficiently curing a surface and an inside of a 3D printer product without problems such as discoloration, deformation, and cracks.

An object to be achieved by the present invention is not limited to the above-mentioned object, and other objects not mentioned may be clearly understood by those skilled in the art from the following description.

According to the embodiments of this invention to achieve the above object, a curing device for a 3D printer product is provided, and the device may comprise a chamber having an accommodation space for accommodating 3D printer products (hereinafter referred to as 3D printer product), and is configured to perform a curing process on the 3D printer product accommodated in the accommodation space under each of a first condition corresponding to a non-vacuum air atmosphere and a second condition corresponding to a vacuum state; a vacuum pump connected to the chamber to form a vacuum in the chamber; an air injection member connected to the chamber to remove a vacuum by injecting air into the chamber; a plurality of light source modules which are members installed inside the chamber to irradiate light for the curing process to the 3D printer product, and consists of at least one first light emitting element generating ultraviolet UV and at least one second light emitting element generating light having a wavelength longer than that of ultraviolet UV; a pedestal which may be rotated and mounted inside the chamber; and a drive actuator for rotating the pedestal.

The curing device for a 3D printer product may include a first process for curing the 3D printer product under a first condition corresponding to the air atmosphere and a second process for curing the 3D printer product under a second condition corresponding to the vacuum state.

The plurality of light source modules may include three side light source modules installed to be spaced apart from each other on the inner surface of the chamber, and one or more top light source modules installed on the bottom surface of the lid of the chamber.

Each of the three side light source modules may be disposed in a form extending in parallel to a height direction of the chamber, and the three side light source modules may be disposed at substantially equal intervals from each other.

Each of the plurality of light source modules may be configured to include a plurality of first light emitting elements and a plurality of second light emitting elements.

The first light emitting element may include a 1-1 light emitting element generating a first ultraviolet UV having a first central wavelength and a 1-2 light emitting element generating a second ultraviolet UV having a second central wavelength different from the first central wavelength.

The second light emitting element may be configured to generate visible light or light in an infrared IR band.

The above-mentioned chamber may include a main body and a lid. The lid may be configured to rotate around a rotation shaft unit provided at one side of the main body to be opened and be closed along a lateral direction against the main body. The plurality of light source modules may include an upper light source module installed on a bottom surface of the lid. The wiring connected to the upper light source module may be disposed to pass through the inside of the rotation shaft unit so that the wiring may not be exposed to the outside.

A plurality of insertion grooves extending in a height direction of the chamber may be spaced apart from each other on an inner surface of the chamber, the light source module may be inserted into each of the plurality of insertion grooves, and a support member facing the light source module may be inserted into each of the plurality of insertion grooves. A fixing member for pushing and fixing the light source module through the support member may be provided as a member coupled to the support member.

The insertion groove may include a first groove with a first width while defining a bottom surface and a second groove unit which is positioned at a deeper place inside the chamber more than the first groove and has a second width smaller than the first width, and the light source module may be in contact with the bottom surface of the first groove. The support member may include a first part inserted into the first groove unit and a second part inserted into the second groove unit. The first part may have a width larger than that of the second part, and at least a part of the first part may be configured to be positioned across the first groove unit and the second groove unit.

At least a part of the plurality of light source modules may be disposed to thermally contact the inner surface of the chamber, and the chamber may act as a heat dissipation member emitting heat for at least a part of the plurality of light source modules.

According to another embodiment of this invention, a curing method for 3D printer product is provided, and the method may comprise an introduction step into for introducing a 3D printer product (hereinafter referred to as a 3D printer product) into an accommodation space of the chamber of the curing device; a first curing step for curing the 3D printer product accommodated in the accommodation space under a first condition corresponding to a non-vacuum air atmosphere; and a second curing step for curing the 3D printer product accommodated in the accommodation space under a second condition corresponding to a vacuum state; and wherein at least one of the first curing step and the second curing step includes a step for heating and curing the 3D printer product by irradiating the 3D printer product with ultraviolet UV, and light having a wavelength longer than ultraviolet UV while rotating the 3D printer product.

Light having a wavelength longer than the ultraviolet ray (UV) may include visible light or infrared light (IR).

The ultraviolet UV may include a first ultraviolet UV having a first central wavelength and a second ultraviolet UV having a second central wavelength different from the first central wavelength.

A plurality of light source modules may be installed inside the chamber, and each of the multiple light source modules may be configured to include at least one first light emitting element which generates ultraviolet UV and at least one second light emitting element which generates light with a wavelength longer than that of ultraviolet UV. The first curing step and the second curing step may be performed by using the plurality of light source modules.

The plurality of light source modules may include three side light source modules installed to be spaced apart from each other on the inner surface of the chamber and one or more top light source modules installed on the bottom surface of the lid of the chamber.

The first light emitting element may include a 1-1 light emitting element generating a first ultraviolet UV having a first central wavelength and a 1-2 light emitting element generating a second ultraviolet UV having a second central wavelength different from the first central wavelength.

The second light emitting element may be configured to generate visible light or light in an infrared IR band.

According to embodiments of the present invention, a curing device and a curing method capable of uniformly and easily and efficiently curing a surface and an inside of a 3D printer product without any problems such as discoloration, deformation, and cracks may be implemented. When a curing device and curing method for a 3D printer product according to embodiments are applied, it is possible to easily manufacture a well-cured 3D printer product having excellent physical properties.

In addition, in the curing device for a 3D printer product according to embodiments of the present invention, since it may be configure a connection wiring which is not be exposed to the outside, aesthetics and convenience of use may be improved due to this configuration. In the curing device for a 3D printer product according to embodiments of the present invention, the light source member (a light source module) is closely fixed to the inside of the chamber in a given manner, thereby increasing the cooling (heat dissipation) efficiency of the light source member (a light source module) and improving the robustness of the assembly structure.

DETAILED DESCRIPTION OF THE INVENTION

Figure 1:
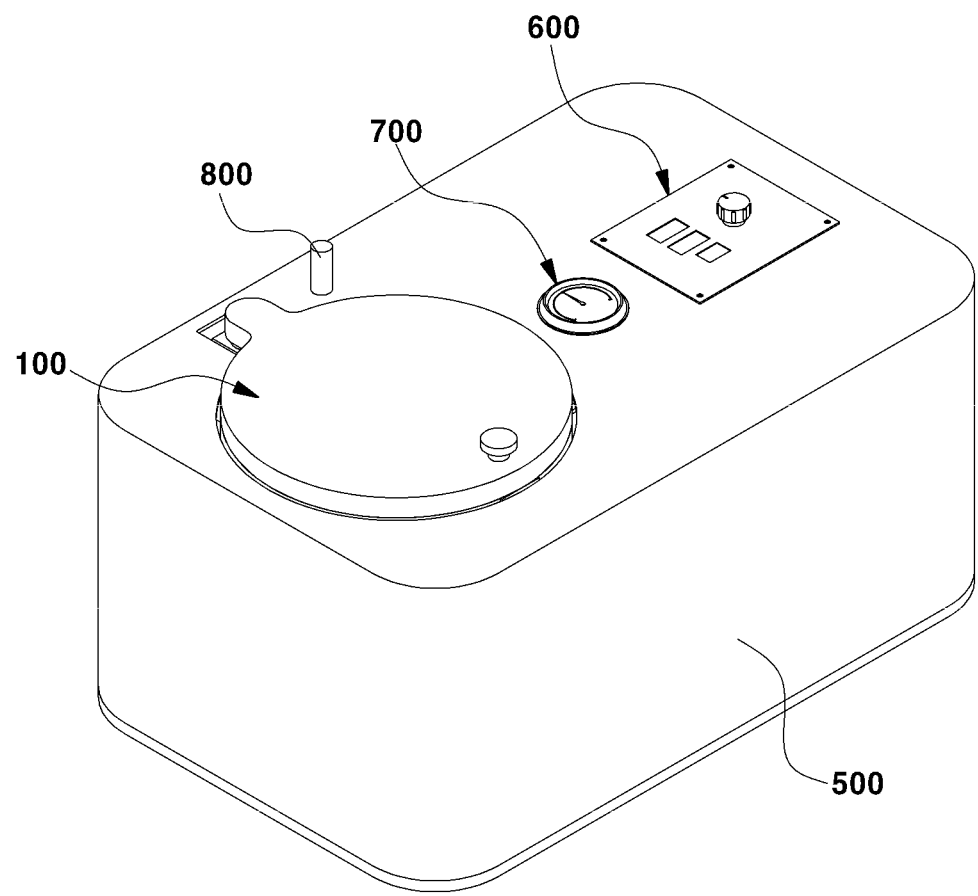
FIGS. 1 to 3 are perspective views illustrating a curing device for a product (hereinafter, a 3D printer product) manufactured by a 3D printer, according to an embodiment of the present invention.

Hereinafter, the embodiments of the present invention will be described in detail with reference to the accompanying drawings.

The embodiments of the present invention to be described below are provided to more clearly explain the present invention to those of ordinary skill in the related art, and the scope of the present invention is not limited by the following embodiments, and the following embodiments may be modified in many different forms.

The terminology used herein is used to describe the specific embodiments, and is not used to limit the present invention. As used herein, terms in the singular form may include the plural form unless the context clearly dictates otherwise. Also, as used herein, the terms "comprise" and/or "comprising" specifies presence of the stated shape, step, number, action, member, element and/or group thereof; and does not exclude presence or addition of one or more other shapes, steps, numbers, actions, members, elements, and/or groups thereof. In addition, the term "connection" as used herein is a concept that includes not only that certain members are directly connected, but also a concept that other members are further interposed between the members to be indirectly connected.

In addition, in the present specification, when a member is said to be located "on" another member, this includes not only a case in which a member is in contact with another member but also a case in which another member is present between the two members. As used herein, the term "and/or" includes any one and any combination of one or more of those listed items. In addition, as used herein, terms such as "about", "substantially", etc. are used as a range of the numerical value or degree, in consideration of inherent fabricating and material tolerances, or as a meaning close to the range. Furthermore, accurate or absolute numbers provided to aid the understanding of the present application are used to prevent an infringer from using the disclosed present invention unfairly.

Hereinafter, embodiments of the present invention will be described in detail with reference to the accompanying drawings. The size or thickness of the regions or parts shown in the accompanying drawings may be slightly exaggerated for clarity and convenience of description. The same reference numerals refer to the same elements throughout the detailed description.

Figure 2:
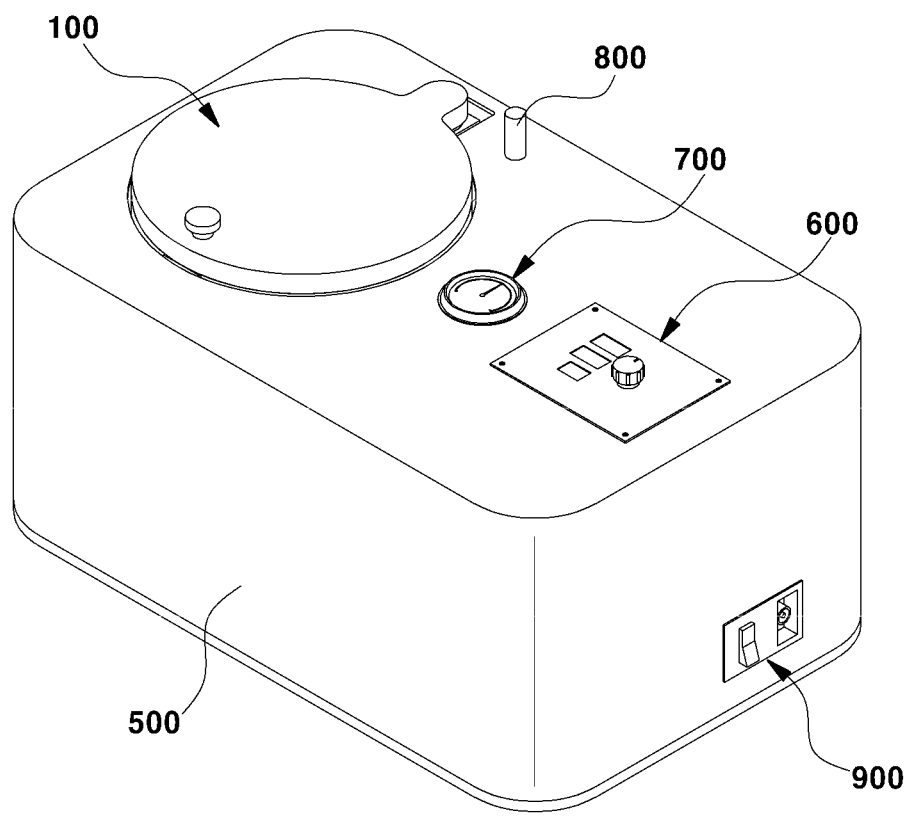
Figure 3:
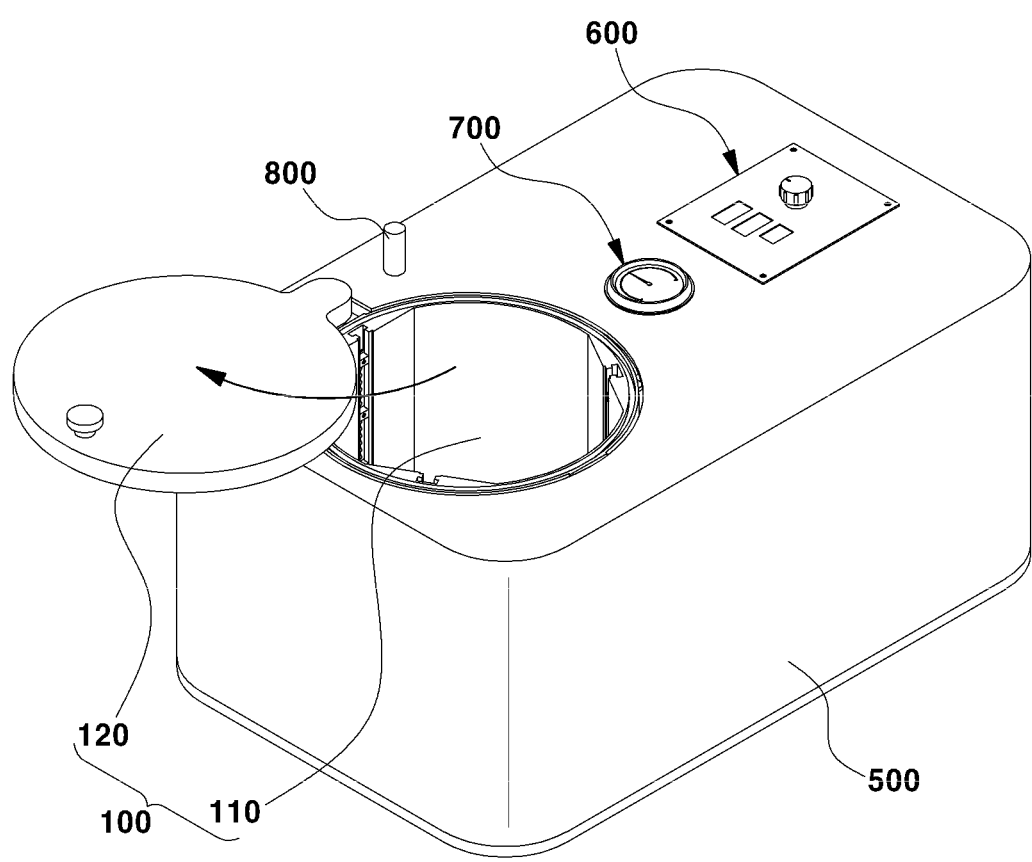

FIGS. 1 to 3 are perspective views illustrating a curing device for a product (hereinafter, a 3D printer product) manufactured by a 3D printer, according to an embodiment of the present invention. Referring to FIGS. 1 to 3, the curing device for a 3D printer product according to an embodiment of the present invention may include a chamber 100 having an accommodation space in which the 3D printer product is accommodated. The chamber 100 may be referred to as a "curing chamber". The curing device for a 3D printer product may include a case member 500, and a chamber 100 may be installed in the case member 500. The case member 500 may have, for example, a box-type structure, and the chamber 100 may be installed such that its upper surface may be exposed to the upper surface of the case member 500.

The curing device for a 3D printer product may further include a control and display unit 600 and a pressure gauge 700 installed to be exposed to a predetermined area of the case member 500. For example, the control and display unit 600 and the pressure gauge 700 may be installed to be exposed to the upper surface of the case member 500, but the positions thereof may vary in some cases. In addition, in some cases, the pressure gauge 700 may be integrated into the control and display unit 600.

In addition, the curing device for a 3D printer product may further include a stopper 800 protruding from an upper surface of the case member 500. The stopper 800 may be installed adjacent to the chamber 100. The stopper 800 may serve to guide a direction in which the lid portion 120 of the chamber 100 (see FIG. 3) is opened. When the lid 120 is rotated to the side where the stopper 800 is located to open the lid 120, the lid 120 may be caught by the stopper 800 and thus, rotation thereof is limited. Accordingly, the lid portion 120 of the chamber 100 may not be opened in the direction in which the stopper 800 is located, and may be opened in the opposite direction.

In addition, as shown in FIG. 2, the curing device for a 3D printer product may further include a power switch and connection socket unit 900. The power switch and connection socket unit 900 may be installed to be exposed to one side of the case member 500, for example, but the position thereof may be variously changed.

As shown in FIG. 3, the chamber 100 may include a main body (a chamber main body) 110 and a lid 120. The upper portion of the main body 110 may have a container structure in which the upper portion is opened and the lower portion is substantially blocked. The main body 110 may have a cylindrical structure with a circular cross-section in which a lower end is substantially blocked. The lid 120 may be configured to open and close the opened upper portion of the main body 110. The lid 120 may be configured to be able to open and close in a lateral direction with respect to the main body 110 by rotating around a 'rotation shaft unit' provided on one side of the main body 110. A sealing member such as an O-ring may be provided between the lid 120 and the main body 110.

The chamber 100 may be configured to perform a curing process on the 3D printer production accommodated in the internal accommodation space in each of a first condition corresponding to a non-vacuum air atmosphere and a second condition corresponding to a vacuum state. The curing device for a 3D printer product may be configured to perform a first curing process for curing the 3D printer product under a first condition corresponding to the air atmosphere and to perform a second curing process for curing the 3D printer product under a second condition corresponding to the vacuum state. In the air atmosphere, the pressure of the chamber 100 may be atmospheric pressure (1 atm=101.325 kPa=760 mmHg) or similar. In the vacuum state, the degree of vacuum of the chamber 100 may be, for example, in the range of about −10 kPa to −100 kPa. If the degree of vacuum of the chamber 100 is too high in the vacuum state, the 3D printer product may be deformed, and if the degree of vacuum is too low, the effect of the curing process in the vacuum state may be degraded. Accordingly, the degree of vacuum of the chamber 100 in the vacuum state may be preferably about −10 kPa to −100 kPa. In addition, an appropriate degree of vacuum may vary depending on the type of resin of the 3D printer product.

In the first curing process for curing the 3D printer production under the first condition corresponding to the air atmosphere, an internal curing of the 3D printer production may be effectively performed. In addition, in the second curing process for curing the 3D printer product under the second condition corresponding to the vacuum state, the surface part of the 3D printer product may be effectively cured. Accordingly, according to an embodiment of the present invention, the internal part and the surface part of the 3D printer product may be cured relatively uniformly.

If the 3D printer product is cured only in an air atmosphere, the surface part of the 3D printer product may not be well cured due to a curing obstacle caused by oxygen. At this time, when strong ultraviolet rays are irradiated for a relatively long time to cure the surface part, overcuring may occur along the surface bending of the product, resulting in discoloration or deformation.

If the 3D printer product is cured only in a vacuum atmosphere, the inside of the 3D printer product may not be well cured. In this case, a separate thermal curing process may be additionally performed after the ultraviolet curing process. However, when the thermosetting process is additionally performed, there is a problem that the process becomes complicated and cumbersome. In addition, when the surface part is cured first and subsequently the inside is cured, defects such as cracks may occur in the already cured surface part during the internal curing process.

According to an embodiment of this invention, the 3D printer product is cured for the first time in a first condition corresponding to an air atmosphere, and then the 3D printer product is cured in a second condition corresponding to a vacuum state. The inside and the surface of the 3D printer product may be sequentially and stably cured. By curing the inside of the 3D printer product under the first condition and then curing the surface portion of the 3D printer product under the second condition, the inside and the surface of the 3D printer product may be uniformly and well cured without problems such as discoloration, deformation, and cracks.

Figure 4:
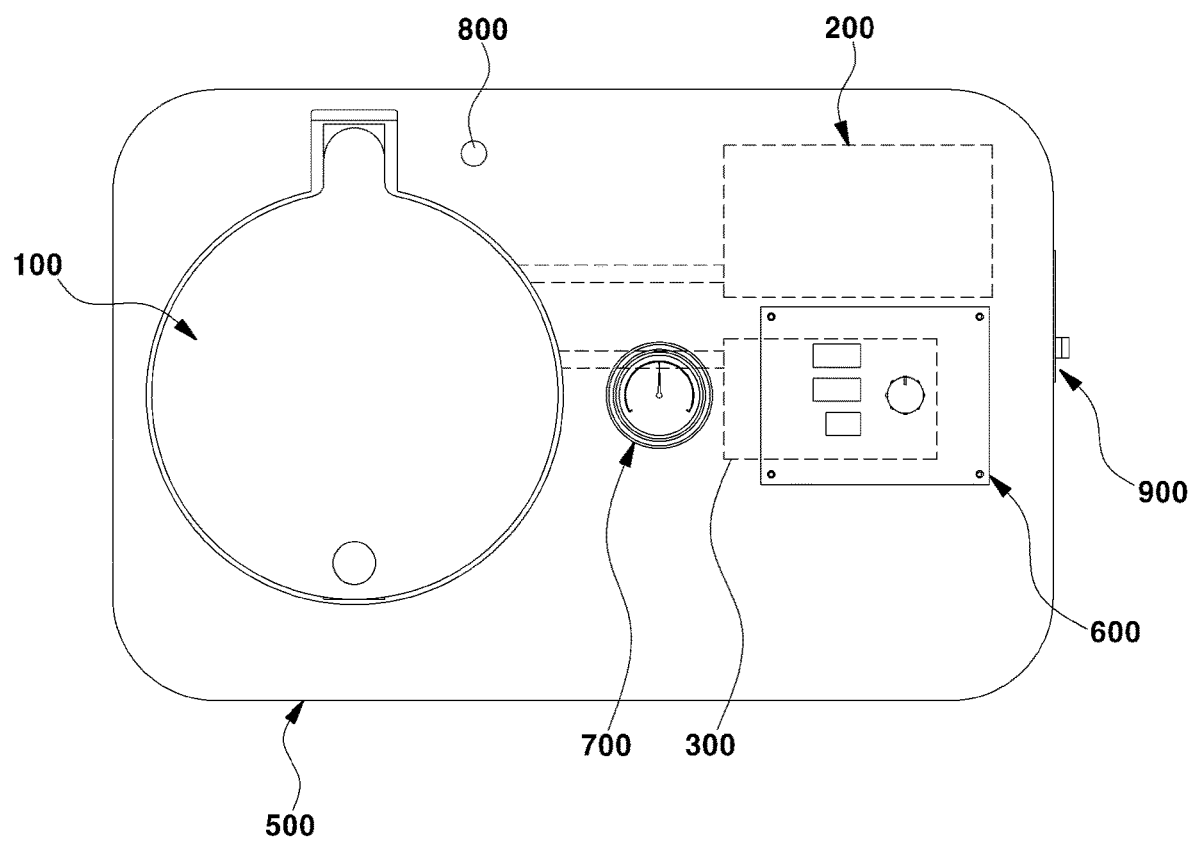
FIG. 4 is a plan view illustrating a structure of a curing device for a 3D printer product as viewed from above according to an embodiment of the present invention.

FIG. 4 is a plan view illustrating a structure of a curing device for a 3D printer product as viewed from above according to an embodiment of the present invention.

Referring to FIG. 4, the curing device for a 3D printer product according to an embodiment of the present invention may include a vacuum pump 200 and an air injection member 300 provided in the case member 500. The vacuum pump 200 may be connected to the chamber 100 and may be used to form a vacuum in the chamber 100. The air injection member 300 may be connected to the chamber 100 and may serve to remove a vacuum state by injecting air into the chamber 100. The air injection member 300 may include a kind of purge valve. By appropriately using the vacuum pump 200 and the air injection member 300, a first condition (a process environment) corresponding to an air atmosphere may be formed or a second condition (a process environment) corresponding to a vacuum atmosphere (a vacuum state) may be formed in the chamber 100.

Figure 5:
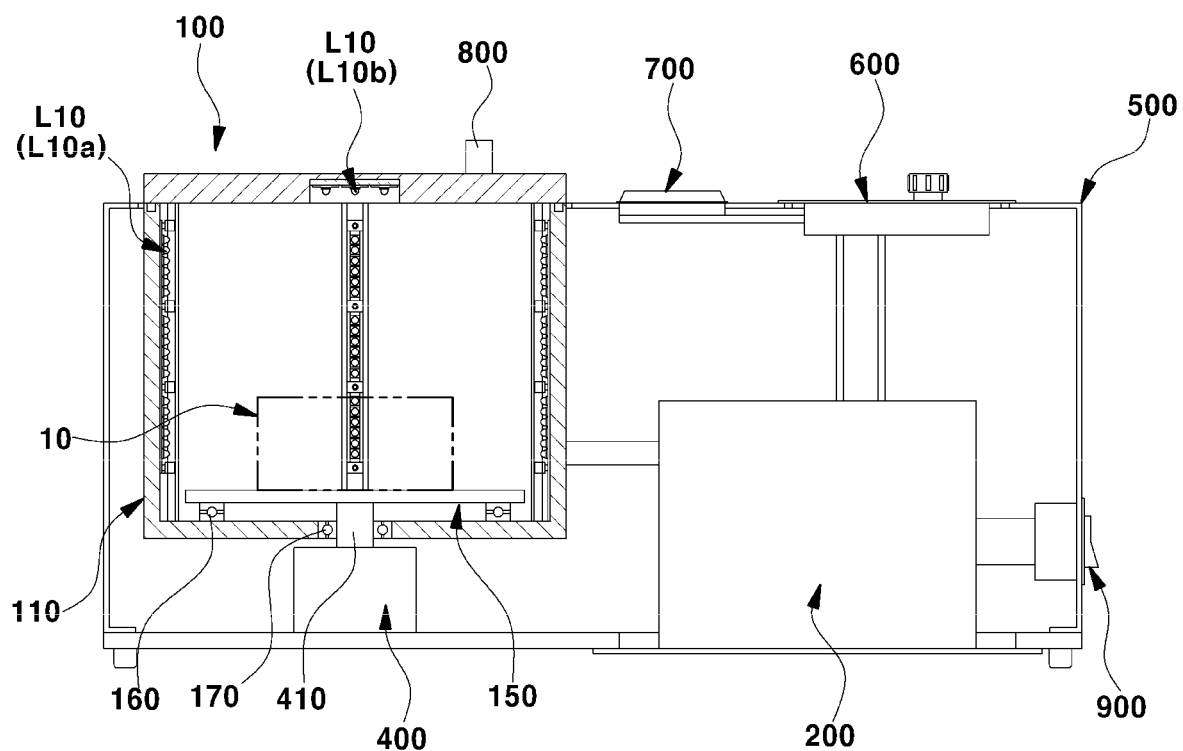
FIG. 5 is a cross-sectional view illustrating a curing device for a 3D printer product according to an embodiment of the present invention.

FIG. 5 is a cross-sectional view illustrating a curing device for a 3D printer product according to an embodiment of the present invention.

Referring to FIG. 5, the curing device for a 3D printer product according to an embodiment of the present invention may include a case member 500, a chamber 100, a vacuum pump 200, a control and display unit 600, a pressure gauge 700, a stopper 800, a power switch and connection socket 900. The chamber 100 may include a main body 110 and a lid 120.

The curing device for a 3D printer product may include a plurality of light source modules L10 installed inside the chamber 100. The plurality of light source modules L10 may serve to irradiate light for a curing process to the 3D printer product 10 accommodated in the accommodation space. The plurality of light source modules L10 may include at least one first light emitting element generating ultraviolet UV rays and at least one second light emitting element generating light having a wavelength longer than that of ultraviolet UV. The first light emitting element may be a light emitting diode (UV LED) element. The second light emitting element may be a visible light LED element or an infrared IR LED element. The ultraviolet UV may be applied to a UV curing (i.e., photocuring) process for curing the 3D printer product 10. The light (e.g., a visible light or an infrared light) having a wavelength longer than that of the ultraviolet UV may be applied for heating and curing (i.e., a thermal curing process) the 3D printer product 10. Accordingly, the second light emitting element may be referred to as 'a light emitting element for heating'.

Each of a plurality of light source modules L10 may be configured to include a plurality of first light emitting elements and a plurality of second light emitting elements. Here, the first light emitting element may include a 1-1 light emitting element generating a first ultraviolet UV having a first central wavelength and a 1-2 light emitting element generating a second ultraviolet UV having a second central wavelength different from the first central wavelength. The second light emitting element may be configured to generate visible light or light in an infrared IR band. As a specific example, each of the light source modules L10 may include a plurality of 1-1 light emitting elements, a plurality of 1-2 light emitting elements, and a plurality of second light emitting elements. The 1-1 light-emitting elements may be configured to generate a first ultraviolet UV with a central wavelength of approximately 385 to 405 nm (ex, 395 nm). The 1-2 light emitting element may be configured to generate a second ultraviolet UV with a central wavelength of about 355 to 375 nm (ex, 365 nm). For example, the second light emitting element may be configured to generate visible light with a central wavelength of about 440 nm to 460 nm (ex, 450 nm). By using a plurality of light emitting elements (1-1 and 1-2 light emitting elements) generating ultraviolet rays (the first and second ultraviolet rays) having different central wavelengths, curing characteristics and curing efficiency may be improved. In addition, by using a light emitting element (the second light emitting element) generating light (ex, visible light, or infrared light) having a wavelength longer than that of the ultraviolet (UV), a curing characteristic improvement effect due to thermal curing may be obtained.

A plurality of light source modules L10 may include a plurality of side light source modules L10a installed to be spaced apart from each other on the inner surface of the chamber 100 and one or more top light source modules L10b installed on the bottom surface of the lid 120. For example, three side light source modules L10a may be spaced apart from each other on the inner surface of the main body 110, and one or more top light source modules L10b may be disposed at the center of the bottom surface of the lid 120. Each of the three side light source modules L10a may be disposed to extend in parallel with the height direction of the chamber 100, and the three side light source modules L10a may be disposed at substantially equal intervals from each other. Three side light source modules L10a may be positioned so that two adjacent side light source modules L10a may form an inner angle of 120° with respect to the center of the chamber 100. Each of the side light source modules L10a may have a direction angle (a light irradiation angle) of about 60°, and the side light source modules L10a may be installed at three places obtained by dividing a circle to reduce interference with each other and to secure light space distribution uniformity.

The curing device for a 3D printer product may further include a pedestal 150 which may be rotated and provided in the chamber 100, and a driving actuator 400 for rotating the pedestal 150. The 3D printer product 10 may be placed on the pedestal 150. By rotating the pedestal 150 using the driving actuator 400, the 3D printer product 10 may be rotated, and the curing process may be performed by irradiating the 3D printer product 10 with light while rotating the 3D printer product 10.

The pedestal 150 may have a disk shape, for example, and the pedestal 150 may be supported by a predetermined bearing 160 so that the 3D printer product 10 may be stably rotated in a state in which the 3D printer product 10 is placed. That is, the bearing 160 may be disposed between the inner bottom plate of the main body 110 and the pedestal 150. The bearing 160 may be, for example, a thrust bearing.

The pedestal 150 and the driving actuator 400 may be connected to each other by a driving shaft 410. The pedestal 150 may be coupled to the driving shaft 410 to rotate together with the driving shaft 410. A through hole may be formed at the bottom of the main body 110, and the driving shaft 410 may pass through the through hole and be coupled to the pedestal 150. In addition, the gap between the driving shaft 410 and the through hole may be sealed by the sealing member 170 to maintain the air-tightness of the chamber 100, and at the same time, the driving shaft 410 of the driving actuator 400 may be configured to smoothly rotate. Here, the sealing member 170 may be formed of, for example, a retainer.

According to an embodiment of this invention, by using a light module L10 consisting of at least one first light emitting element generating ultraviolet UV and at least one second light emitting element (ex, visible light or infrared) having a wavelength longer than that of ultraviolet UV, UV curing and thermal curing may be simultaneously carried out. Through this process, it is possible to obtain an effect of improving curing properties. By simultaneously performing UV curing and thermal curing, a curing process may be efficiently performed without the hassle of performing a separate heat treatment process. Accordingly, according to an embodiment of the present invention, the inside and the surface of the 3D printer product 10 may be uniformly and excellently cured. In particular, by appropriately arranging a plurality of light source modules L10 on the inner surface and the upper surface of the chamber 100, curing characteristics and efficiency may be further improved. In addition, when the first light emitting element of the light source module L10 includes a 1-1 light emitting element generating first ultraviolet rays and a 1-2 light emitting element generating second ultraviolet rays, there is an effect that curing efficiency may be further improved.

According to an embodiment of this invention, under the first condition corresponding to the air atmosphere, UV curing and thermal curing may be carried out by using both the at least one first light emitting element generating ultraviolet UV, and the at least one second light emitting element (a heating light emitting element) generating light having a wavelength longer than that of ultraviolet UV. In addition, even in a second condition corresponding to a vacuum state, UV curing and thermal curing may be performed by using both at least one first light emitting element generating ultraviolet UV and at least one second light emitting element (light emitting element for heating) generating longer wavelength than ultraviolet UV.

Heating of an object using visible/infrared light in a vacuum state may be more effective. Heat transfer methods may be classified according to conduction, convection, and radiation, and heating of an object in a vacuum may be more efficient for the following reasons. First of all, when an object is heated in a vacuum, there is no heat loss due to convection because there is no air, and there is no heat emission due to convection in a state where light energy absorbed in a sample is changed to heat. Secondly, in connection with heat transfer by radiation, the heated object emits energy corresponding to the square ($T^4$) of its temperature, and the energy is generally emitted in the form of infrared rays. For example, in a chamber made of aluminum, infrared rays from a 3D printer's product are reflected from the inside wall of the chamber, so heat dissipation by radiation may not be easy. Thirdly, heat dissipation by conduction may be partially performed only near the bottom surface of the 3D printer product. Since the 3D printer product is composed of resin, it may be difficult for heat of the entire 3D printer product to be transferred through the bottom of the resin. In conclusion, when heating the 3D printer product with visible or infrared light source in vacuum, the 3D printer product may be heated more efficiently than heating it in air.

Furthermore, in accordance with an embodiment of this invention, by appropriately disposing a plurality of light source modules (L10) on the inner surface and the upper surface of the chamber (100), curing characteristics and efficiency may be further improved. During the curing process, the 3D printer product 10 may be placed on the pedestal 150 adjacent to the bottom of the chamber 100. In order to effectively cure the same, the light source (i.e., the light source module L10) may be preferably disposed on the upper surface and the side surface. Unlike the light source module L10b on the upper surface, in the case of the light source modules L10a on the side surface, when the light source modules L10a face each other, since the light source modules L10a may affect light on each other. Therefore, it may be desirable to arrange the side light source modules L10a to reduce such interferences. In addition, since the directional angle (a light irradiation angle) of each of the side light source modules L10a may be about 60°, the side light source modules L10a may be installed at three places indicated by equally dividing a periphery of a circle, thereby reducing interference with each other and ensuring optical space distribution uniformity.

Additionally, the raw material for producing the 3D printer product 10 applied to the embodiment of the present invention may be UV-cured ink that may be cured by at least UV, and the UV-cured ink may be a photopolymerization type resin as a kind of photopolymerization resin. Here, the UV curing ink, which is the photopolymerization type resin, may be composed of an oligomer, a viscosity adjustment monomer, a photoinitiator, and the like, which are main components of the resin. The oligomer may be classified into unsaturated polyester/styrene (free radical initiation), polyol/cyol (free radical initiation), acrylate/methacrylate (free radical initiation), cycloaliphatic epoxy/polyol/vinyl ether (cation initiation), and the like according to the kind of the resin and photopolymerization initiation. The photoinitiator may absorb ultraviolet light and become an excitation state to generate free radical or cation, thereby causing polymerization of the resin. The 3D printer product 10 may be manufactured in a three-dimensional form by spraying and laminating UV cured ink for 3D printers, which is at least a material which may be cured by ultraviolet rays.

Meanwhile, in an embodiment of the present invention, the control and display unit 600 may serve to control operations of components connected thereto and to display related information. In the control and display unit 600, an operation time of the light source module L10, a power level of the light source module L10, and a vacuum maintenance time of the chamber 100 may be displayed, and the control button of the control and display unit 600 may include an on/off button of the light source module L10, an operation control button of the vacuum pump 200, and a stop button.

Figure 6:
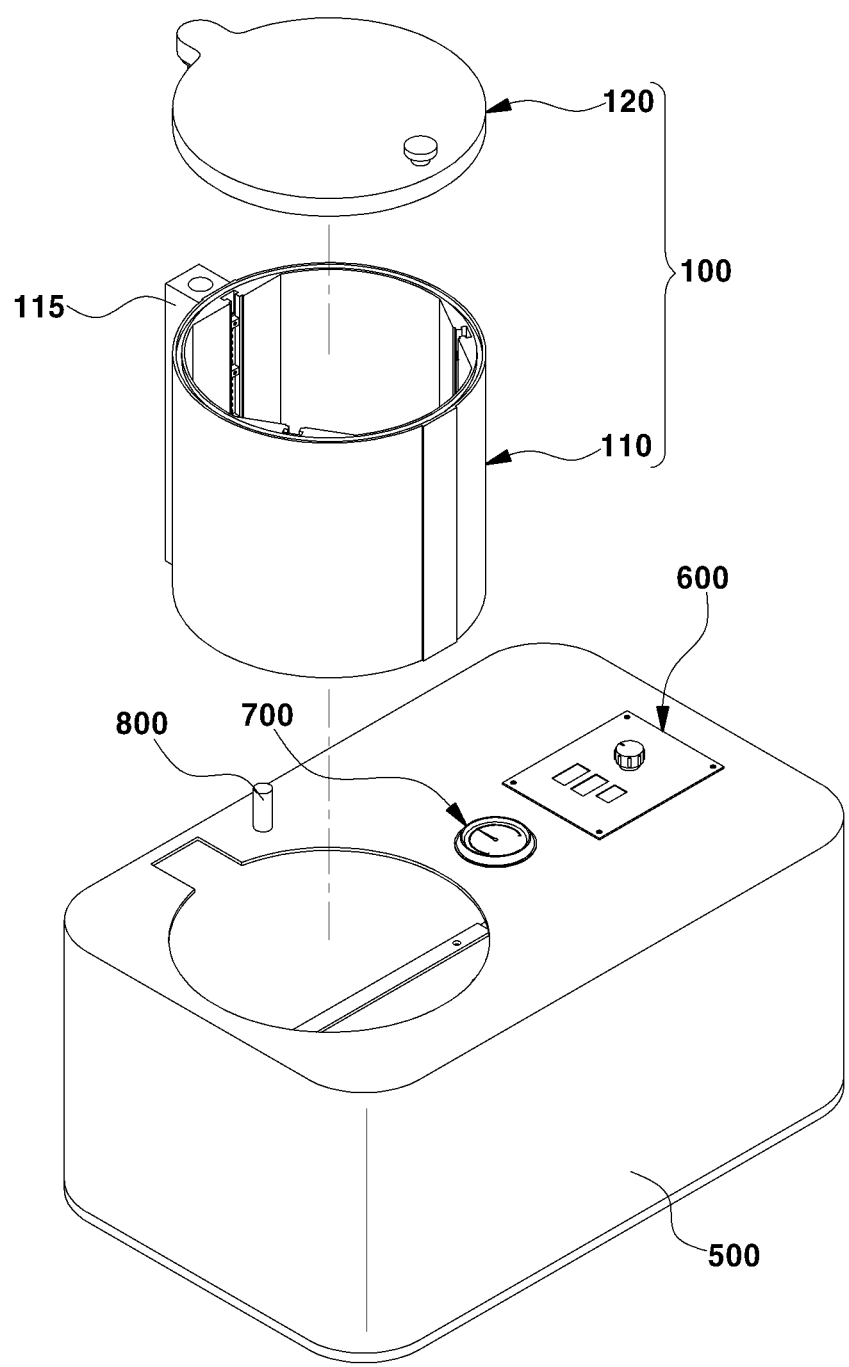
FIG. 6 is an exploded perspective view of a curing device for a 3D printer product according to an embodiment of the present invention.

FIG. 6 is an exploded perspective view of a curing device for a 3D printer product according to an embodiment of the present invention.

Referring to FIG. 6, as described with reference to FIGS. 1 to 5, a chamber 100, a case member 500, a control and display unit 600, a pressure gauge 700, a stopper 800, and the like may be included. The chamber 100 may include a main body 110 and a lid 120. The lid 120 may be configured to be opened and closed in a lateral direction (a side direction) with respect to the main body 110 while it is being rotated around the rotating shaft unit 115 provided on one side of the main body 110. In addition, a wiring (not illustrated) connected to the upper light source module (L10b of FIG. 5) installed on the bottom surface of the lid 120 may be disposed to pass through the inside of the rotation shaft unit 115. Accordingly, the wiring may not be exposed to the outside. Since the wiring is not exposed to the outside, the appearance and ease of use of the curing device for a 3D printer product may be improved. Also, it is possible to fundamentally prevent the occurrence of a problem due to the exposure of the wiring to the outside, and the problems such as defect damage due to repeated use may be prevented.

Figure 7:
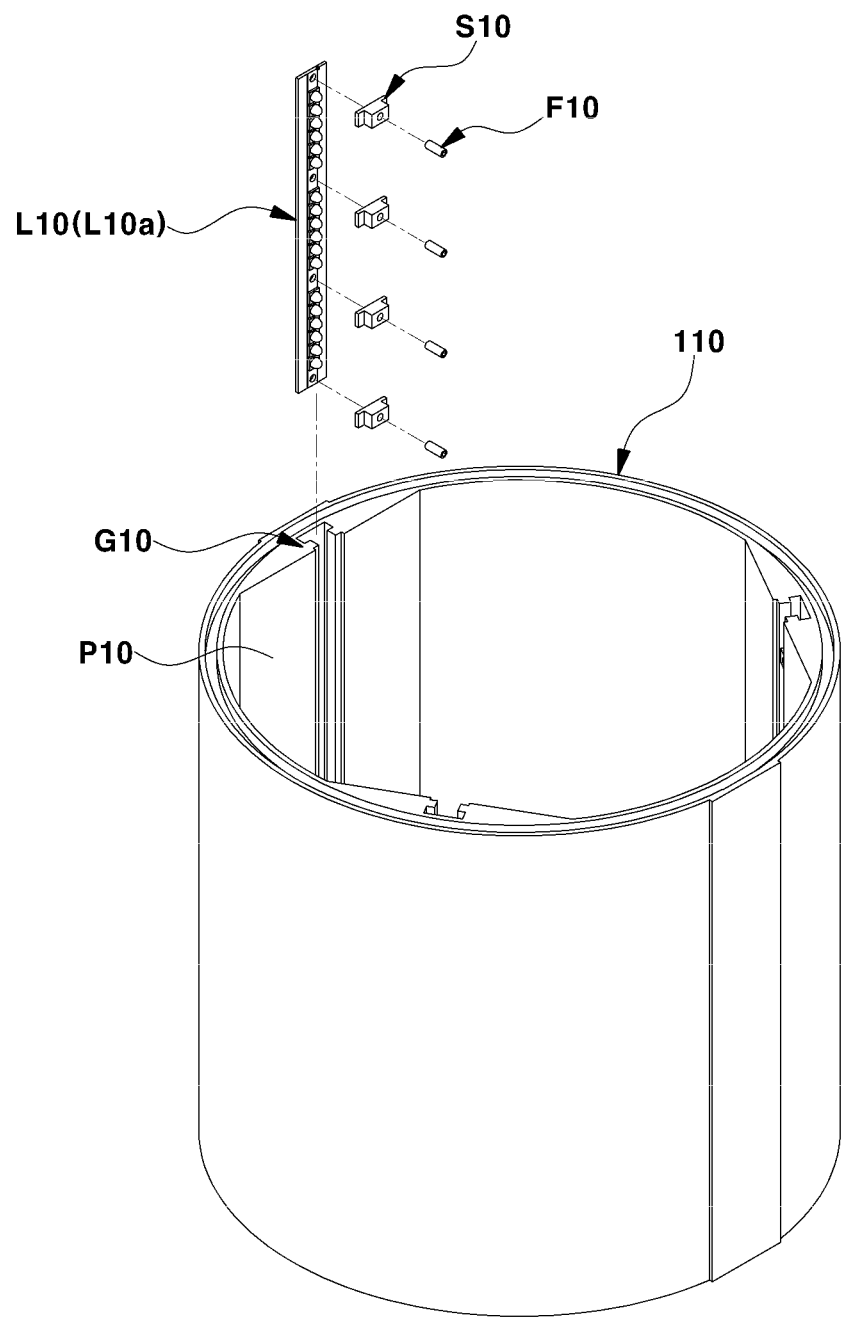
FIG. 7 is an exploded perspective view illustrating the configuration of the main body of FIG. 6 in more detail

FIG. 7 is an exploded perspective view illustrating the configuration of the main body 110 of FIG. 6 in more detail. For convenience, FIG. 7 does not illustrate the rotation shaft unit 115 described in FIG. 6.

Referring to FIG. 7, the main body 110 of the chamber may have a circular cylinder shape having an open top. The main body 110 may be formed of, for example, a metal such as aluminum (Al). Accordingly, according to an embodiment, the main body 110 may be referred to as an Al cylinder. The first use of the Al cylinder is for a vacuum chamber. Al metal is a light metal that may withstand pressure as much as water pressure. Accordingly, the Al cylinder may be suitable for a small low vacuum. The second use of the Al cylinder is suitable for a light reflector. Since Al has a very high reflectance of light such as UV compared to other metals, it is possible to increase optical efficiency for curing by applying an Al cylinder. The third use of the Al cylinder is suitable for heat dissipation. It may serve to effectively dissipate heat generated from the light source module L10 since Al metal has a high thermal conductivity of about ~200 W/mKK. However, in some cases, the material of the main body 110 may vary.

A plurality of insertion grooves G10 extending in a height direction of the chamber may be formed to be spaced apart from each other on an inner surface of the chamber, that is, an inner surface of the body part 110, and the light source module L10 may be inserted into each of the plurality of insertion grooves G10. The light source module L10 may have a kind of bar structure. A plurality of protrusions P10 may be provided on an inner circumferential surface of the main body 110, and the plurality of protrusions P10 may have a flat outer surface. An insertion groove G10 may be formed in each of a plurality of protrusions P10. The main body 110 including a plurality of insertion grooves G10 may be formed according to an extrusion molding method. Three protrusions P10 spaced apart from each other at equal intervals may be provided, and thus three insertion grooves G10 spaced apart from each other at equal intervals may be provided.

A support member S10 facing the light source module L10 may be inserted into and disposed in each of a plurality of insertion grooves G10. In addition, as a member coupled to the support member S10, a fixing member F10 for pushing and fixing the light source module L10 through the support member S10 may be further provided. The fixing member F10 may have a kind of screw or a bolt structure. A plurality of support members S10 and a plurality of fixing members F10 may be disposed with respect to one light source module L10. Light emitting elements of the light source module L10 may be exposed to emit light between a plurality of support members S10.

Figure 8:
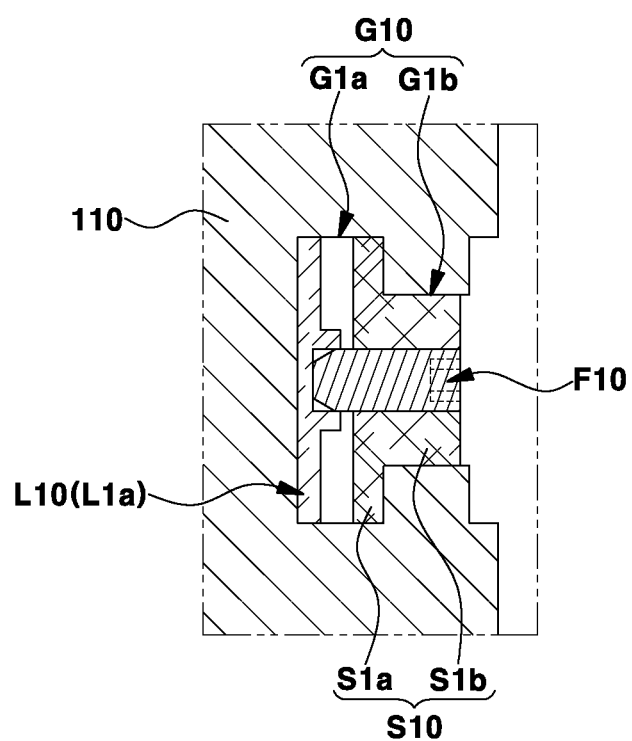
FIG. 8 is a partial cross-sectional view illustrating a coupling form between the main body and the light source module described with reference to FIG. 7.

FIG. 8 is a partial cross-sectional view illustrating a coupling form between the main body 110 and the light source module L10 described with reference to FIG. 7.

Referring to FIG. 8, the insertion groove G10 may include a first groove unit G1a with a first width and defining a bottom side, and a second groove unit G1b positioned in the deeper side of the chamber as compared with the first groove unit G1a and having a second width smaller than the first width. The first groove unit G1a and the second groove unit G1b may be disposed to communicate with each other. It may be understood that the second groove unit G1b is connected to the center of the side surface of the first groove unit G1a. Accordingly, the first groove unit G1a may have a structure extending to both sides with respect to the second groove unit G1b.

The light source module L10 may be disposed to be in contact with the bottom surface of the first groove unit G1a. The support member S10 may include a first part S1a inserted into the first groove unit G1a and a second part G1b inserted into the second groove unit G1b. Here, the first part S1a may have a width greater than that of the second part G1b. The support member S10 may be disposed such that at least a part of the first part S1a is structurally arranged across the first groove unit G1a and the second groove unit G1b. In this state, the fixing member F10 may be disposed to push and fix the light source module L10 through the support member S10. In this case, the printed circuit board (PCB) substrate of the light source module L10 may be pressed and fixed by the fixing member F10. The fixing member F10 may have a kind of screw or a bolt structure. A hole penetrating the central part of the support member S10 may be provided, and the fixing member F10 may be inserted to penetrate the hole. A thread may be formed on the outer circumferential surface of the fixing member F10, and a thread region may be formed on the inner circumferential surface of the hole.

According to an embodiment of this invention, the light source module L10 may be easily fixed by a push method using the support member S10 and the fixing member F10 without processing a screw hole or the like in the main body 110, and the light source module L10 may be arranged in close contact with the inner surface of the main body 110. Accordingly, at least a part of the plurality of light source modules L10 may be disposed to thermally contact the inner surface of the chamber, and the chamber may act as a heat dissipating member emitting heat to at least a part of the plurality of light source modules L10. By attaching/adhering to the light source module L10 to the inside of the main body 110, an effective conduction cooling and heat radiation effect may be obtained through the main body 110 (for example, an Al cylinder) without a separate heat radiation mechanism (for example, an Al heat radiation plate or a cooling fan).

In order to mount the light source module L10 inside the cylinder-shaped main body 110, a bolt tab (a screw hole) needs to be processed inside the main body 110. However, since the inside of the main body 110 is a relatively narrow space, it may be difficult for a machine for processing a tab for bolts to access to it. However, according to an embodiment of this invention, the light source module L10 may be easily fixed by a push method using the support member S10 and the fixing member F10 without processing a bolt tab on the main body 110, and the light source module L10 may be positioned in close contact with the inner surface of the main body 110.

Figure 9:
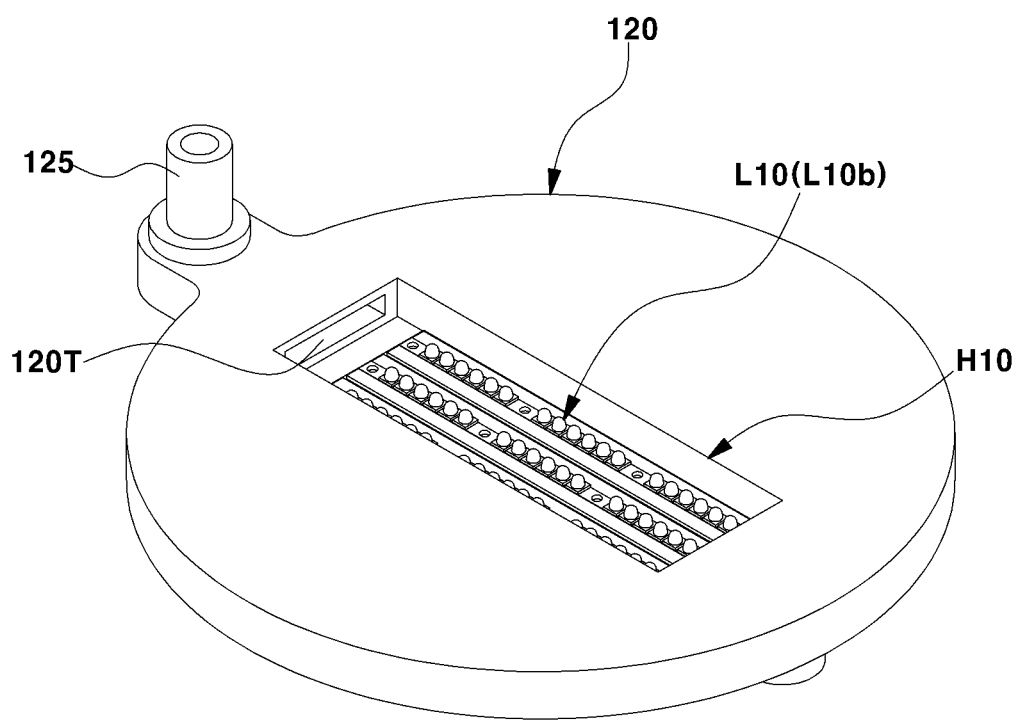
FIG. 9 is a perspective view illustrating the configuration of the lid of FIG. 6 in more detail.

FIG. 9 is a perspective view illustrating the configuration of the lid 120 of FIG. 6 in more detail. FIG. 9 illustrates an exemplary structure of a bottom surface (a lower surface) of the lid 120.

Referring to FIG. 9, for example, the lid 120 may be formed of a metal such as aluminum Al. A predetermined seating groove H10 may be formed on a lower surface of the lid 120, and at least one light source module L10 may be disposed in the seating groove H10. For example, three light source modules L10 may be disposed. Here, the light source module L10 may be referred to as a top light source module L10b. The light source module L10 may have a kind of bar structure.

An extension pillar portion 125 may be provided at one end of the lid portion 120 to protrude therefrom. The extension pillar portion 125 may be inserted into the rotation shaft portion 115 described in FIG. 6. The extension column portion 125 may be referred to as a kind of rotation axis. The extension pillar portion 125 may have a hollow hole. The length of the extension pillar 125 may be variously adjusted.

A wiring (not shown) connected to at least one upper light source module L10b may be disposed to pass through the hollow hole of the extension pillar 125, and may be inserted into the rotation shaft 115 described in FIG. 6. A lead-in hole 120T may be formed in one side surface of the seating groove H10, and the lead-in hole 120T may be connected to the hollow hole. The wiring may be inserted into the hollow hole through the lead-in hole 120T, and may be inserted into the rotation shaft unit 115 of FIG. 6. Accordingly, the wiring may not be exposed to the outside of the curing device. Since the wiring is not exposed to the outside, the appearance and ease of use of the curing device for a 3D printer product may be improved. Also, it is possible to fundamentally prevent the occurrence of a problem due to the exposure of the wiring to the outside, and problems such as defect and damage due to repeated use may be prevented.

Figure 10:
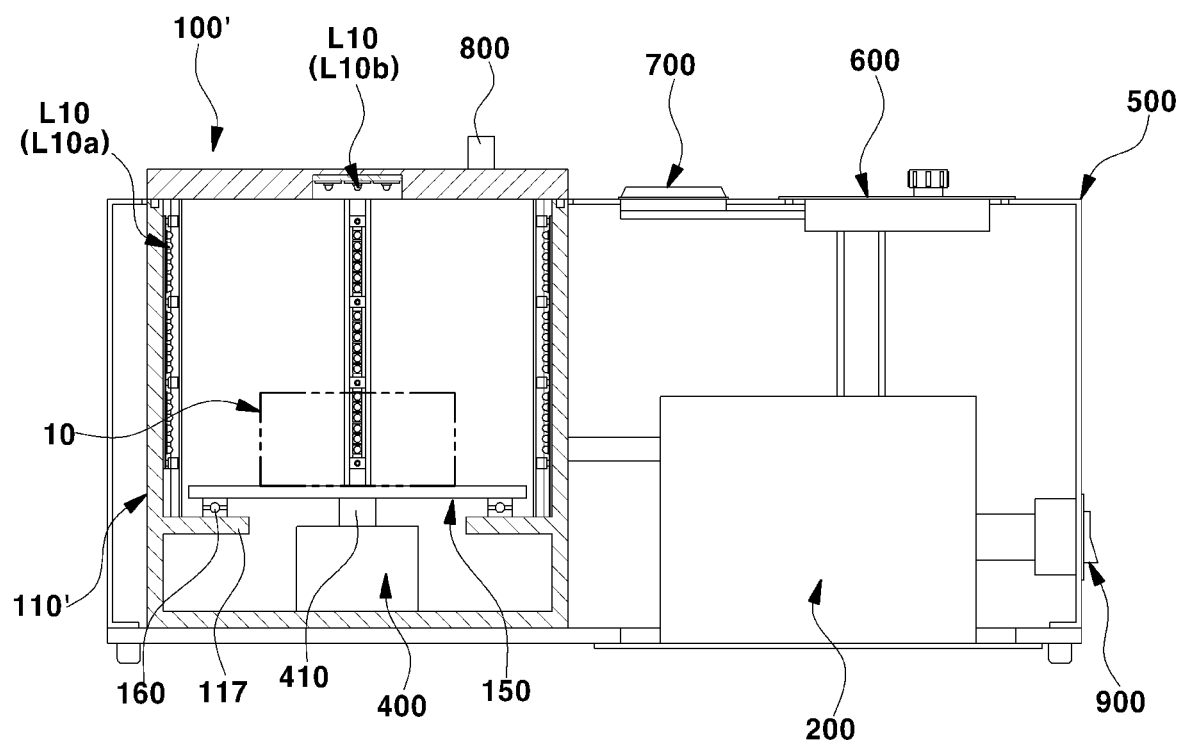
FIG. 10 is a cross-sectional view illustrating a curing device for a 3D printer product according to another embodiment of the present invention.

FIG. 10 is a cross-sectional view illustrating a curing device for a 3D printer product according to another embodiment of the present invention.

Referring to FIG. 10, in the case of the present embodiment, the driving actuator 400 may be disposed inside the main body 110' of the chamber 100'. The main body 110' may include an extension portion 117 provided on an inner surface thereof. The extension portion 117 may have, for example, an annular plate-like structure. A pedestal 150 may be disposed on the expansion unit 117, and a bearing 160 may be provided between the expansion unit 117 and the pedestal 150.

The driving actuator 400 may be disposed under the pedestal 150 on the inner bottom surface of the main body 110'. The driving actuator 400 and the pedestal 150 may be connected to the driving shaft 410. The pedestal 150 may be rotated by the driving actuator 400, and the 3D printer product 10 disposed on the pedestal 150 may be rotated. Meanwhile, power supplied to the driving actuator 400 may be configured to be supplied from the outside of the chamber 100' by a vacuum connector or the like.

In FIG. 10, the other configurations except for some configurations of the chamber 100' may be the same as or similar to those described in FIG. 5, and thus repeated descriptions thereof will be omitted.

Figure 11:
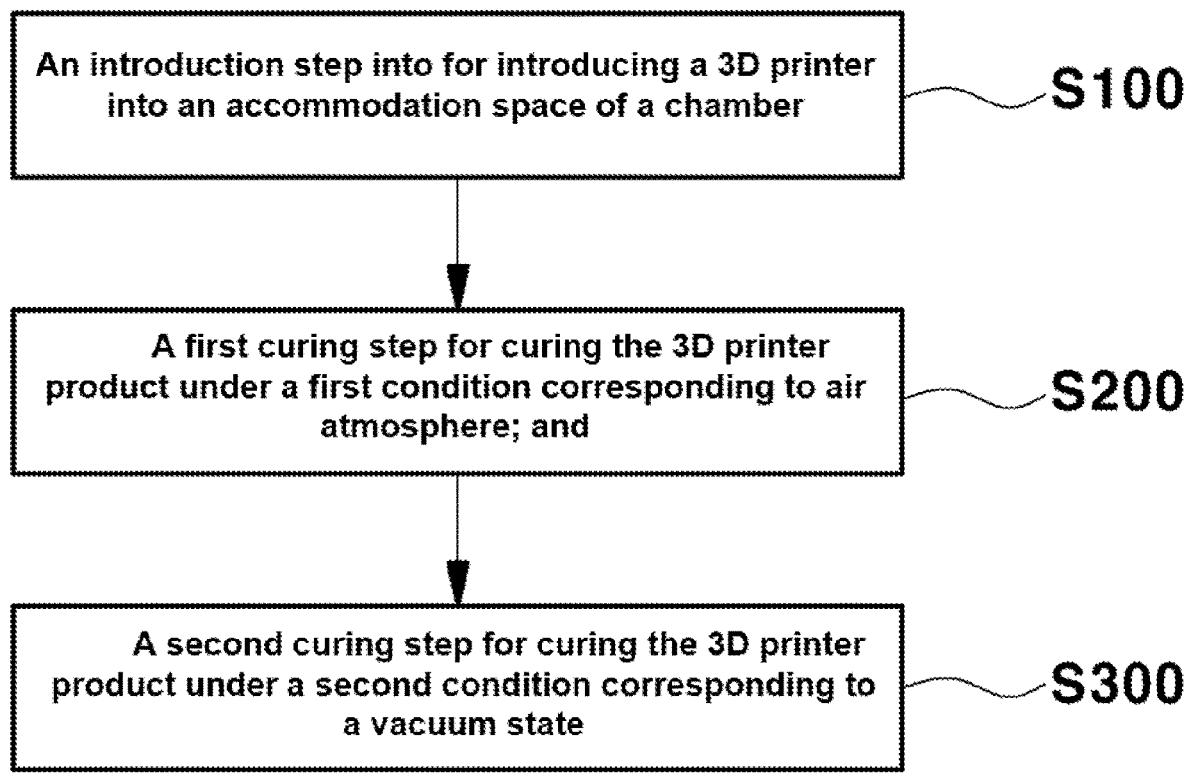
FIG. 11 is a flowchart illustrating a curing method of a 3D printer product according to an embodiment of the present invention.

FIG. 11 is a flowchart illustrating a curing method of a 3D printer product according to an embodiment of the present invention.

Referring to FIG. 11, the curing method for the 3D printer product according to an embodiment of this invention may include a step S100 for introducing the 3D printer product into a chamber space of the curing device; a first curing step S200 for curing the 3D printer product accommodated in the accommodation space under a first condition corresponding to a non-vacuum air atmosphere; and a second curing step S300 for curing the 3D printer product contained in the accommodation space under a second condition corresponding to a vacuum state.

At least one of the first curing step S200 and the second curing step S300 may include a step for heating and curing 3D printer product at the same time by irradiating the 3D printer product with ultraviolet UV, and the light having a wavelength longer than ultraviolet UV while rotating the 3D printer product.

A Light having a wavelength longer than the ultraviolet ray UV may include visible light or infrared light IR. The ultraviolet UV may include a first ultraviolet UV with a first central wavelength and a second ultraviolet UV with a second central wavelength different from the first central wavelength.

A plurality of light source modules may be installed inside the chamber, and each of the plurality of light source modules may be configured to include at least one first light emitting element which generates ultraviolet UV, and at least one second light emitting element which generates light with a wavelength longer than ultraviolet UV. The first curing step and the second curing step may be performed by using the plurality of light source modules.

The first light emitting element may include a 1-1 light emitting element generating a first ultraviolet UV having a first central wavelength and a 1-2 light emitting element generating a second ultraviolet UV having a second central wavelength different from the first central wavelength. The second light emitting element may be configured to generate visible light or light in an infrared IR band.

The plurality of light source modules may include three side light source modules installed to be spaced apart from each other on the inner surface of the chamber, and one or more top light source modules installed on the bottom surface of the lid of the chamber.

The curing method for a 3D printer product according to an embodiment described with reference to FIGS. 1 to 10 may be applied to the curing method of a 3D printer product according to an embodiment of the present invention described with reference to FIG. 11. Specific features of the curing method of the 3D printer product may be referred to from FIGS. 1 to 10 and related descriptions.

As described above, according to embodiments of the present invention, a curing device and a curing method capable of uniformly, easily and efficiently curing a surface part and an inside of a 3D printer product without problems such as discoloration, deformation, and cracks may be implemented. By applying a curing device and curing method for a 3D printer product according to embodiments, it is possible to easily manufacture a well-cured 3D printer product having excellent physical properties. In addition, in the curing device for a 3D printer product according to embodiments of the present invention, since connection wiring may not be exposed to the outside, aesthetics and convenience of use may be improved. Further, in the curing device for a 3D printer product according to embodiments of the present invention, the light source member (a light source module) is closely fixed to the inside of the chamber in a given manner, thereby increasing the cooling (heat dissipation) efficiency of the light source member (a light source module) and improving the robustness of the assembly structure.

The present specification discloses preferred embodiments of the present invention. Although specific terms are used, they are used only in a general sense to easily explain the technological contents of the present invention and to help understanding of the present invention and is not intended to limit the scope of the present invention. In addition to the embodiments disclosed herein, it is obvious to those skilled in the art that other modified examples based on the technological concepts of the present invention may be implemented.

For example, those having ordinary knowledge in the field of a related technology may understood that a curing device for a 3D printer product and a curing method of a 3D printer product according to embodiments described with reference to FIGS. 1 to 11 may be variously modified. Therefore, the scope of the present invention is not deter-

EXPLANATION OF SYMBOLS

| | |
|---|---|
| 10: 3D printer product | 100, 100': chamber |
| 110, 110': main body | 115: rotation shaft unit |
| 117: expansion unit | 120: lid |
| 125: extension column unit | 160: bearing unit |
| 170: sealing member | 200: vacuum pump |
| 300: air injection member | 400: drive actuator |
| 410: drive shaft | 500: case member |
| 600: control and display unit | 700: pressure gauge |
| 800: stopper | |
| 900: a power switch and connection socket unit | |
| L10: light source module | L10a: side light source module |
| L10b: top light source module | P10: protrusions |
| G10: insertion groove | S10: support member |
| F10: fixing member | H10: seating groove |

What is claimed is:

1. A curing device for a 3D printer product comprising, a chamber having an accommodation space for accommodating 3D printer products (hereinafter referred to as 3D printer product), and configured to perform a curing process on the 3D printer product accommodated in the accommodation space under each of a first condition corresponding to a non-vacuum air atmosphere and a second condition corresponding to a vacuum state;
a vacuum pump connected to the chamber to form a vacuum in the chamber;
an air injection member connected to the chamber to remove a vacuum by injecting air into the chamber;
a plurality of light source modules which are members installed inside the chamber to irradiate light for the curing process to the 3D printer product, and consist of at least one first light emitting element generating ultraviolet UV and at least one second light emitting element generating light having a wavelength longer than that of ultraviolet UV;
a pedestal which is rotated and mounted inside the chamber; and
a drive actuator for rotating the pedestal,
wherein the chamber includes a main body and a lid,
the lid is configured to rotate around a rotation shaft unit provided at one side of the main body to be opened and be closed along a lateral direction against the main body,
the plurality of light source modules include an upper light source module installed on a bottom surface of the lid, and the wiring connected to the upper light source module is disposed to pass through the inside of the rotation shaft unit so that the wiring may not be exposed to the outside.

2. The curing device for a 3D printer product according to claim 1, further comprising,
a control unit for controlling to perform a first process for curing the 3D printer product under a first condition corresponding to the air atmosphere and after performing the first process, to perform a second process for curing the 3D printer product under a second condition corresponding to the vacuum state,
wherein the second light emitting element is configured to generate a light in an infrared IR band.

3. The curing device for a 3D printer product according to claim 1, wherein the plurality of light source modules include three side light source modules installed to be spaced apart from each other on the inner surface of the chamber, and one or more top light source modules installed on the bottom surface of the lid of the chamber.

4. The curing device for a 3D printer product according to claim 3, wherein each of the three side light source modules is disposed in a form extending in parallel to a height direction of the chamber, and the three side light source modules is disposed at substantially equal intervals from each other.

5. The curing device for a 3D printer product according to claim 1, wherein each of the plurality of light source modules are configured to include a plurality of first light emitting elements and a plurality of second light emitting elements.

6. The curing device for a 3D printer product according to claim 1, wherein the first light emitting element includes a 1-1 light emitting element generating a first ultraviolet UV having a first central wavelength and a 1-2 light emitting element generating a second ultraviolet UV having a second central wavelength different from the first central wavelength.

7. The curing device for a 3D printer product according to claim 1, wherein at least a part of the plurality of light source modules is disposed to thermally contact the inner surface of the chamber, and the chamber serves as a heat dissipation member emitting heat for at least a part of the plurality of light source modules.

8. A curing device for a 3D printer product comprising,
a chamber having an accommodation space for accommodating 3D printer products (hereinafter referred to as 3D printer product), and configured to perform a curing process on the 3D printer product accommodated in the accommodation space under each of a first condition corresponding to a non-vacuum air atmosphere and a second condition corresponding to a vacuum state;
a vacuum pump connected to the chamber to form a vacuum in the chamber;
an air injection member connected to the chamber to remove a vacuum by injecting air into the chamber;
a plurality of light source modules which are members installed inside the chamber to irradiate light for the curing process to the 3D printer product, and consist of at least one first light emitting element generating ultraviolet UV and at least one second light emitting element generating light having a wavelength longer than that of ultraviolet UV;
a pedestal which is rotated and mounted inside the chamber; and
a drive actuator for rotating the pedestal,
wherein a plurality of insertion grooves extending in a height direction of the chamber is spaced apart from each other on an inner surface of the chamber,
the light source module is inserted into each of the plurality of insertion grooves,
a support member facing the light source module is inserted into each of the plurality of insertion grooves,
a fixing member for pushing and fixing the light source module through the support member is provided as a member coupled to the support member, and
wherein the insertion groove includes a first groove with a first width while defining a bottom surface and a second groove unit which is positioned at a deeper place inside the chamber more than the first groove and has a second width smaller than the first width,
the light source module is contact with the bottom surface of the first groove, the support member includes a first part inserted into the first groove unit and a second part inserted into the second groove unit, the first part has a width larger than that of the second part, and at least a part of the first part is configured to be positioned across the first groove unit and the second groove unit.

* * * * *